Patented May 19, 1942

2,283,465

UNITED STATES PATENT OFFICE 2,283,465

TREATMENT OF PHENOLS

Raymond E. Schaad, Chicago, Ill., assignor to Universal Oil Products Company, Chicago, Ill., a corporation of Delaware No Drawing. Application February 16, 1939, Serial No. 256,761

9 Claims. (Cl. 260—624)

The process of this invention relates more particularly to the manufacture of unsaturated phenols.

In a more specific sense the invention has reference to a process of alkylating phenols with diolefinic hydrocarbons in the presence of catalysts to produce desirable substances which may be used as such or as intermediates in organic syntheses.

It is a noteworthy fact in any particular organic reaction involving the decomposition of single compounds, or the interaction of two or more compounds, that many times the reaction velocity constants are of a low order under moderate conditions of temperature and pressure corresponding to a low order of secondary or side reactions, these latter resulting in the alteration of the primary desired products. For different reactions catalysts of extremely variable character have been found empirically which accelerate the reaction sufficiently so that a laboratory process can be operated upon a commercial scale.

Very few rules have been evolved which enable the prediction of the catalytic activity of any substance in a given organic reaction or the selection of a particular substance for a particular reaction. Metals, metal oxides, metal salts, and various acids and alkalies, and substances of an ordinarily inert character which furnish an adsorbent contacting surface, have been tried and in different instances have proved effective. The catalysts which characterize the process of the present invention are of an essentially acid character.

In one specific embodiment the present invention comprises a process for the production of unsaturated phenols which consists in treating phenols with diolefinic gaseous or liquid hydrocarbons at elevated conditions of temperature and pressure in contact with granular catalytic materials comprising acids of phosphorus and carrying or spacing materials of an adsorptive character.

The essential ingredient of the granular catalysts which are employed to alkylate phenols with diolefins, according to the process of the present invention, is phosphoric acid, which may constitute 80% or more of the catalyst mixture, and in most cases is over 30% by weight thereof. Of the various acids of phosphorus, the orthophosphoric acid ($H_3PO_4$) is generally preferred on account of its alkylating ability, its cheapness and the readiness with which it may be procured, although the invention is not restricted to its use but may employ any of the other acids of phosphorus in so far as they are adaptable. It is not intended to infer, however, that the different acids of phosphorus which may be employed will produce identical effects upon any given alkylation reaction, as each acid will exert its own characteristic action.

Solid phosphoric acid catalysts, which are particularly utilizable in the present alkylation process, may be made by mixing an acid of phosphorus, such as ortho- or pyro-phosphoric acid, with a finely divided, relatively inert and a generally siliceous carrier such as, for example, kieselguhr, to form a rather wet paste (the acid ordinarily being in major proportion by weight); calcining at temperatures in the order of 400 to 500° C. to produce a solid cake; grinding and sizing to produce particles of usable mesh; and rehydrating the catalyst granules at temperatures of the order of 260° C. to produce an acid composition corresponding to the optimum alkylating activity which usually corresponds approximately to the pyro-acid in composition.

This catalyst preparation procedure may be varied by forming particles from the original paste by extrusion or pelleting methods and following with the calcining and rehydrating steps. In the reactions taking place during calcination it is evident that some acid is "fixed" on the carrier and that some metaphosphoric acid, which is substantially without alkylating activity is formed. The rehydrating step evidently produces an acid composition corresponding closely to the pyro-acid having a formula $H_4P_2O_7$. Unless rehydration is practiced the temperature of approximately 300° C. should not be exceeded in the calcination step. And if higher temperatures produce catalyst particles of greater structural strength, depending upon the character of the carrier and the composition of acid fixed therewith, the composition of the acid may be brought to the desired point by contact with superheated steam at approximately 260° C. at atmospheric pressure. This brief description of a solid phosphoric acid catalyst and of its preparation is not exhaustive, as both have been described already in U. S. Patents 1,993,512, 1,993,513, and others.

Solid phosphoric acid catalysts are hydroscopic to a variable extent and are best ground, sized, and preserved for use out of contact with moist air.

Because of the possibility of varying both the active phosphoric acid ingredients and the relatively inert adsorbent materials which go to form the solid phosphoric acid catalyst masses, a number of alternative catalysts exist each of which will have its own particular catalyzing character which will not be exactly equivalent to that of the masses of different composition.

By using phosphoric acid catalysts in granular form it has now been found convenient and feasible to alkylate phenols with diolefinic hydrocarbons while adjusting the conditions of operation in respect to the activity of the reacting constituents, particularly in regard to the diolefins. It is known that conjugated diolefins are generally more reactive than the non-conjugated diolefins and in cases involving these conjugated compounds less severe conditions of temperature, pressure, time of contact, and amounts and strength of acid catalyst are necessary than when employing the non-conjugated diolefin hydrocarbons.

Contrasting the action of solid phosphoric acid catalyst for alkylating phenols by diolefins with sulphuric acid used for the same process, it has been found that the phosphoric acid catalysts have a more moderate and controllable action with substantially no tendency to oxidize or unduly promote polymerization reactions at the expense of the desired alkylation. This is particularly in evidence in the case of conjugated diolefins, such as butadiene.

When using sulphuric acid and alkylating with gaseous butadiene, which may be produced synthetically or recovered by suitable methods from the gases produced as by-products in oil cracking reactions, the polymerization reaction may proceed to the extent of forming polymers of high molecular weight which approach the consistency of resins or high molecular weight gums. The use of sulphuric acid as catalyst for the alkylation of phenols is accompanied by undesirable sulfonation of the alkylated products, as well as of reacting materials. It is not to be inferred, however, that all polymerization and other undesired reactions may be obviated entirely when using granular phosphoric acid catalysts, but that these undesired reactions may be reduced substantially.

The reactions between diolefins and phenols in the presence of granular catalysts of the present type are basically of a simple character, although there may be a certain amount of side reactions due, principally, to a certain amount of ester formation with the phosphoric acid. Apparently the intermediate-compound theory of catalysis best explains the observed reactions which means, in the present instance that both types of reacting components probably form primarily transient addition compounds with the phosphoric acids which then react further to produce the alkylated phenols and regenerate the acid catalyst.

The following equation may represent the course of a typical reaction induced between a diolefin and a phenol by a granular phosphoric acid catalyst:

$C_6H_5OH + CH_2=CH-CH=CH_2 \rightarrow$
Phenol  butadiene

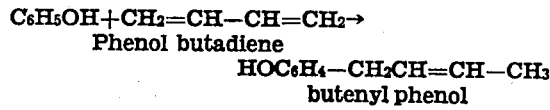
butenyl phenol

As indicated in the above equation phenol reacts with butadiene to give butenyl phenol by a typical 1,4-addition characteristic of conjugated diolefins. Also, this product is capable of undergoing conversion reactions in the presence of granular phosphoric acid catalysts to give other reaction products of phenol and butadiene than the one indicated in the above equation, such as a difference in the position of the double bond in the butene chain.

While the butenyl phenol fraction comprises a substantial portion of the alkylation products, other materials of higher boiling points and molecular weights are formed presumably through further alkylation and condensation reactions as will be illustrated in a later example. These other products also possess both phenolic and olefinic characteristics.

The process of this invention may be carried out by mixing the diolefin hydrocarbon with an excess, preferably with two to four times its molar equivalent, of the phenol and then passing the resultant solution in the presence or absence of a non-polar diluent, such as a paraffin or naphthenic hydrocarbon, through a suitable tower or chamber, containing granular phosphoric acid catalyst maintained at an elevated temperature in the approximate range of 100–300° C. The reaction may be effected under pressures varying from atmospheric to approximately 600 pounds per square inch. While it is at times desirable to effect the process of this invention at a number of different temperatures and pressures throughout the ranges indicated above, it is not implied that these different conditions are equal or equivalent, nor that their use necessarily leads to production of alkylation products in the same proportions, or of the same character. It is usual that a particular choice of conditions favors the production of a major proportion of some one or another desired reaction product.

When the diolefin used is gaseous, as butadiene, the process may be so controlled that practically all of the products are liquid, in which case, substantially complete consumption of the diolefin is effected. The products are separated from the unreacted phenol by distillation and this unreacted material is returned to the process for mixing with additional quantities of the diolefin used in the alkylation reaction. The total alkylated product may be separated into the desired fractions by distillation at ordinary pressure and under vacuum so as to separate the mono alkylated products from the higher boiling material containing one or more phenolic rings combined with one or more molecules of the diolefin.

Alkylation may be caused to proceed to the formation of more highly alkylated compounds by increasing the proportion of diolefin, and the time and temperature of the reaction.

While the foregoing method of passing the reacting mixture downwardly through a suitable tower containing the catalyst is the more customary procedure, alkylation reactions with solid phosphoric acid catalysts may be brought about, also, under relatively high pressure in closed vessels in which some of the reacting constituents are in liquid phase and in which the catalyst particles are maintained in suspension by some method of agitation. Reacting constituents in mixed phase may also be forced together through stationary sections of the catalyst to effect the same type of reaction. The choice of any part of this type of operation will depend upon such circumstances as the temperature and pressure found to be most effective in producing the desired type of alkylation.

Butenyl phenol produced by the process of this invention may be converted into p-normal butyl phenol by mild hydrogenation at a temperature in the range of approximately 25–100° C. and under pressures in the approximate range of 50 to 100 atmospheres. Such hydrogenation is preferably carried out in the presence of a non polar diluent or solvent. Butenyl phenol may be utilized, also, in the production of resins and in the synthesis of other desired valuable products.

The following example is given to illustrate the character of the results obtained by the use of the present process, although the data presented are only from a selected case and are not introduced with the intent of restricting unduly the scope of the invention:

A mixture comprising 155 parts by weight of phenol and 39 parts by weight of butadiene was passed during a four hour period through a chamber containing 50 parts by weight of granular phosphoric acid catalyst maintained at a temperature of approximately 200° C. and under approximately 100 pounds pressure. Thus the molar ratio of phenol to butadiene charged was approximately 2.3. After this treatment none of the butadiene remained unconverted, the total product being obtained in the form of a liquid. A test on a small portion showed that this liquid product was completely soluble in sodium hydroxide solution and, therefore, consisted entirely of phenolic substances. Vacuum distillation separated the liquid products into unconverted phenol, higher boiling alkylation or condensation products and a relatively high molecular weight residue which remained as bottoms at the conclusion of the vacuum distillation.

The yields of the different fractions of these products are given in the table.

TABLE

*Products of alkylation of phenol by butadiene*

| Fraction No. | Normal boiling range | Products derived from mole percent of charge | |
|---|---|---|---|
| | | Phenol | Butadiene |
| | ° C. | | |
| 1 | 177–231 | 57.5 | |
| 2 | 231–254 | 15.8 | 35.6 |
| 3 | 254–388 | 6.7 | 30.2 |
| 4 | Bottoms | 20.0 | 34.2 |
| Totals | | 100.0 | 100.0 |

A primary alkylation product with a normal range of approximately 231–254° C. had a molecular weight of 160 and contained 80.0% carbon and 8.4% hydrogen. These values correspond to approximately the molecular weight and composition of butenyl phenol having the empirical formula $C_{10}H_{12}O$. By mild hydrogenation this product is convertible into normal butyl phenol.

The product with a normal boiling range of approximately 254–388 but boiling mainly at 363–388° C. comprised more complex condensation products formed by the reaction of 1 molecular portion of phenol with 2 or 3 molecular portions of butadiene, or by the interaction of 2 molecular portions each of phenol and butadiene.

The high molecular weight residue, or bottoms from the vacuum distillation comprised still more complex condensation products and was very hard and brittle at room temperature but softened on warming. This material, with an average molecular weight of 505, had the appearance of a resin and its solution in a suitable solvent, such as in ether, dried to a varnish-like coating.

The nature of the present invention and of its commercial utility can be seen from the specification and example given, though neither section is intended to be unduly limiting on its generally broad scope.

I claim as my invention:

1. A process for producing alkylated phenols which comprises subjecting a phenol to the action of an unsaturated aliphatic hydrocarbon containing two double bonds in the presence of a solid mixture comprising essentially a phosphoric acid and an absorbent carrier at an elevated temperature of about 100° to about 300° C.

2. A process for producing alkylated phenols which comprises subjecting a phenol to the action of an unsaturated aliphatic hydrocarbon containing two double bonds in the presence of a granular precalcined mixture of an acid of phosphorus and a siliceous adsorbent at a temperature of about 100° to about 300° C.

3. A process for producing alkylated phenols which comprises subjecting a phenol to the action of an unsaturated aliphatic hydrocarbon containing two double bonds in the presence of a granular precalcined mixture of an acid of phosphorous and a siliceous adsorbent at a temperature of about 100° to about 300° C. under a pressure within the range of atmospheric to approximately 600 pounds per square inch.

4. A process for producing alkylated phenols which comprises subjecting a phenol to the action of an unsaturated aliphatic hydrocarbon containing two double bonds in the presence of a granular precalcined mixture of pyrophosphoric acid and diatomaceous earth at a temperature of about 100° to about 300° C. and under a pressure within the range of atmospheric to approximately 600 pounds per square inch.

5. A process for producing substantial yields of normal butyl phenol which comprises subjecting a mixture of phenol and butadiene-1,3 to treatment at a temperature of about 100° to about 300° C. under a pressure of approximately atmospheric to approximately 600 pounds per square inch in the presence of a solid mixture comprising essentially a phosphoric acid and an absorbent carrier, fractionally distilling the products, separating therefrom the monobutenyl phenols, and hydrogenating said monobutenyl phenols to normal butyl phenol at a temperature of about 25° to about 100° C. under super-atmospheric pressure, in the presence of a hydrogenation catalyst.

6. A process for producing substantial yields of normal butyl phenol which comprises subjecting a mixture of phenol and butadiene-1,3 to alkylation at a temperature of about 100° to about 300° C. under a pressure of approximately atmospheric to approximately 600 pounds per square inch in the presence of a granular precalcined mixture of an acid of phosphorus and a siliceous adsorbent, fractionally distilling the products, separating therefrom the monobutenyl phenols, and hydrogenating said monobutenyl phenols to normal butyl phenol at a temperature of about 25° to about 100° C. under super-atmospheric pressure in the presence of a hydrogenation catalyst.

7. A process for producing substantial yields of normal butyl phenol which comprises subjecting a mixture of phenol and butadiene-1,3 to alkylation at a temperature of about 100° to about 300° C. under a pressure of approximately atmospheric to approximately 600 pounds per square inch in the presence of a granular solid precalcined mixture of an acid of phosphorus and a siliceous adsorbent, fractionally distilling the products, separating therefrom the mono-butenyl phenols, and hydrogenating in a non-polar diluent said mono-butenyl phenols to normal butyl phenol in the presence of a hydrogenation catalyst.

8. A process for producing alkylated phenols which comprises alkylating a phenol with an unsaturated aliphatic hydrocarbon containing two double bonds in the presence of a solid mixture comprising essentially an acid of phosphorus and an absorbent carrier and at a temperature of from about 100° C. to about 300° C.

9. A process for producing alkylated phenols which comprises alkylating a phenol with an unsaturated aliphatic hydrocarbon containing two double bonds in the presence of a solid mixture comprising essentially a phosphoric acid and a siliceous adsorbent and at a temperature of from about 100° C. to about 300° C.

RAYMOND E. SCHAAD.